United States Patent
Achenbach

(10) Patent No.: US 9,664,446 B2
(45) Date of Patent: May 30, 2017

(54) METHOD FOR PRODUCING AGGREGATE AND CALCIUM CARBONATE FROM CONCRETE COMPOSITE MATERIALS, AND A DEVICE FOR CARRYING OUT SAID METHOD

(71) Applicant: CEMEX RESEARCH GROUP AG, Brugg bei Biel (CH)

(72) Inventor: Gunther Achenbach, Wermelskeirchen (DE)

(73) Assignee: Cemex Research Group AG, Brugg Bei Biel (CH)

( * ) Notice: Subject to any disclaimer, the term of this patent is extended or adjusted under 35 U.S.C. 154(b) by 10 days.

(21) Appl. No.: 14/420,998

(22) PCT Filed: Aug. 27, 2013

(86) PCT No.: PCT/EP2013/067704
§ 371 (c)(1),
(2) Date: Feb. 11, 2015

(87) PCT Pub. No.: WO2014/040852
PCT Pub. Date: Mar. 20, 2014

(65) Prior Publication Data
US 2015/0210594 A1 Jul. 30, 2015

(30) Foreign Application Priority Data

Sep. 14, 2012 (EP) .................................. 12184415

(51) Int. Cl.
*C01F 11/18* (2006.01)
*F27B 7/20* (2006.01)
*C04B 18/16* (2006.01)
*C04B 20/02* (2006.01)
*C04B 11/00* (2006.01)

(52) U.S. Cl.
CPC ............... *F27B 7/20* (2013.01); *C01F 11/18* (2013.01); *C04B 11/00* (2013.01); *C04B 18/167* (2013.01); *C04B 20/023* (2013.01); *Y02W 30/95* (2015.05)

(58) Field of Classification Search
CPC ....................................................... C01F 11/18
See application file for complete search history.

(56) References Cited

U.S. PATENT DOCUMENTS 7,550,127 B2 * 6/2009 Takahashi .............. A01G 33/00
423/225
8,864,878 B2 * 10/2014 Handagama ....... B01D 53/1425
423/220

FOREIGN PATENT DOCUMENTS

| FR | 1308209 A | 11/1962 |
|---|---|---|
| JP | H05238790 A | 9/1993 |
| KR | 100970431 B1 | 7/2010 |
| WO | WO 93/08936 | 5/1993 |
| WO | WO 96/35092 | 11/1996 |
| WO | WO 2009/024826 A1 | 2/2009 |

OTHER PUBLICATIONS

International Search Report from corresponding International Patent Application No. PCT/EP2013/067704, dated Jan. 10, 2014 (English-language translation provided).
Database WPI, Week 199342, Thomson Scientific, London, GB; AN 1993-331233 XP002689729, & JP 5 238790 A (Sumitomo Cement Co), Sep. 17, 1993 (Sep. 17, 1993), Abstract. (Please see corresponding JP H05238790 (A) Patent Document.)
Database WPI, Week 201056, Thomson Scientific, London, GB; AN 2010-J51073 XP002689728 & KR 100 970 431 B1 (Korea Inst Constr Technology) Jul. 15, 2010 (Jul. 14, 2010), Abstract. (Please see corresponding KR 100970431 (B1) Patent Document.)

* cited by examiner

*Primary Examiner* — Stuart Hendrickson
(74) *Attorney, Agent, or Firm* — Kusner & Jaffe

(57) ABSTRACT

The invention relates to a method for producing aggregate and calcium carbonate from concrete aggregate, and a device for carrying out said method.

12 Claims, 1 Drawing Sheet

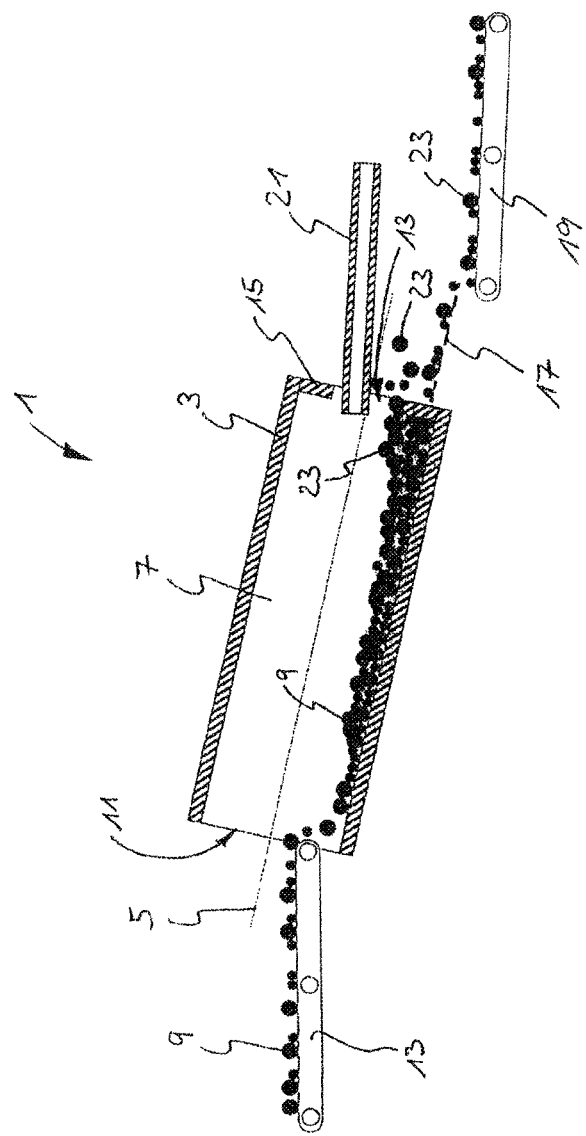

METHOD FOR PRODUCING AGGREGATE AND CALCIUM CARBONATE FROM CONCRETE COMPOSITE MATERIALS, AND A DEVICE FOR CARRYING OUT SAID METHOD

RELATED APPLICATIONS

This application is a National Stage of International Application No. PCT/EP2013/067704 filed Aug. 27, 2013, which claims the benefit of European Patent Application No. 12184415.3, filed Sep. 14, 2012.

FIELD OF THE INVENTION

The invention relates to a method for producing aggregate and calcium carbonate from concrete aggregate and to a device to carrying out said method.

BACKGROUND OF THE INVENTION

Concrete is an artificial stone that consists of hardened cement paste and aggregate materials. The aggregate materials are embedded in a matrix formed of hardened cement paste or are bonded to the hardened cement paste.

Aggregates (that is to say in particular "aggregate" in the sense of DIN EN 12620:2011-03) in concrete can be gravel, chippings, crushed stone and/or sand.

The hardened cement paste of the concrete consists of set cement. Main constituents of the cement, besides Portland cement clinker, include one or more of the following further constituents: ground granulated blastfurnace slag, pozzolan, fly-ash and ground limestone. To form hardened cement paste from cement, the foregoing constituents are mixed with water, whereupon this mixture hardens after some time and forms hardened cement or what is known as hardened cement paste. In order to produce concrete, cement, aggregate materials and water are mixed with one another, such that the aggregate materials are incorporated into the hardened cement paste once the cement has hardened.

Concrete can be used as building material for a wide range of purposes, for example in building construction and civil engineering. If concrete is no longer required after an intended period of use, it can be fed to a recycled use. By way of example, it is known to comminute concrete following its primary use as building material and to feed it in this form as recycled concrete aggregate to a further, secondary use. However, such recycled aggregate generally is not formed by high-quality raw material or building material, and therefore use thereof as raw material or building material is frequently limited. By way of example, recycled concrete aggregate can be used in small quantities as aggregate in concrete or in road construction, for example as a frost protection layer or base layer.

The object of the present invention is to utilize concrete, following primary use thereof, in a novel, further secondary use. In particular, the object of the present invention is to obtain high-quality new raw materials from concrete following primary use thereof.

Within the scope of the invention, it has surprisingly been found that it is possible to obtain new, high-quality raw materials from concrete that can be used as high-quality building materials or for production of high-quality building materials.

In accordance with the invention, in order to achieve the above-mentioned object, a method is provided for producing aggregate and calcium carbonate from concrete aggregate, said method comprising the following steps:
  introducing bulk material comprising concrete aggregate into a reaction chamber;
  feeding a gas comprising carbon dioxide into the reaction chamber;
  comminuting the bulk material in the reaction chamber;
  leaving the concrete aggregate and the gas comprising carbon dioxide to react with one another to form reaction products in the reaction chamber;
  removing the reaction products from the reaction chamber.

The invention is based on the finding that, with continuous comminution and simultaneous application of gas comprising carbon dioxide, concrete aggregate forms reaction products that in particular also comprise calcium carbonate and aggregate materials.

When the concrete aggregate is left to react with the carbon dioxide of the gas comprising carbon dioxide, the concrete aggregate in particular is also carbonated, and the carbonatable components of the hardened cement paste of the concrete aggregate are carbonated by the carbon dioxide. In particular, the carbonatable components of the hardened cement paste are components of calcium oxide (CaO) of the CSH phases of the hardened cement paste. Due to the continuous comminution of the concrete aggregate during the application of the gas comprising carbon dioxide to the concrete aggregate, the aggregate constantly forms new surfaces, which can be acted on by the carbon dioxide. It is thus possible that the carbonatable components of the concrete aggregate are acted on comprehensively by carbon dioxide, such that a very extensive carbonation of the carbonatable components of the concrete aggregate is possible. Furthermore, it has surprisingly been found in accordance with the invention that the comminution of the concrete aggregate with simultaneous application of carbon dioxide causes the aggregate materials of the concrete aggregate to detach very easily from the hardened cement paste matrix. Obviously, this is because the carbonated hardened cement paste acted on by carbon dioxide detaches significantly more easily from the aggregate materials of the concrete aggregate than the uncarbonated hardened cement paste.

As a result, the reaction products therefore also comprise considerable proportions of calcium carbonate and aggregate materials, wherein both materials can be present largely unbonded to one another or to other materials. The aggregate materials of the concrete aggregate therefore can be present in particular largely loosely in the reaction products.

Due to the method according to the invention, it is therefore possible on the one hand to obtain high-quality aggregate materials in the form of substantially pure aggregate materials that were incorporated into the concrete aggregate used the method. By way of example, the aggregate materials obtained by the method according to the invention can in turn be used as high-quality aggregate materials for the production of concrete.

On the other hand, calcium carbonate formed from the hardened cement paste of the concrete aggregate is obtained by the method according to the invention. By way of example, the calcium carbonate obtained can be calcined to form calcium oxide and can then be used as binder.

In accordance with the invention, it has been found that carbon dioxide is bonded particularly comprehensively and quickly to calcium oxide from concrete aggregate, provided the aggregate and gas comprising carbon dioxide are left to react with one another in a temperature range from 60° to 95° C., in particular in a temperature range from 70° to 80° C. The reaction chamber of a device used to carry out the method according to the invention therefore can be designed in particular for temperatures of at least 60° C. or at least 70° C.

The bulk material is a pourable, substantially granular material. It has been found in accordance with the invention that even small proportions of certain substances in the bulk material, which are not concrete aggregate, can hinder or also completely suppress the formation of aggregate materials and calcium carbonate from the concrete aggregate by means of the method according to the invention. For this reason, the bulk material preferably comprises predominantly concrete aggregate. The bulk material particularly preferably comprises concrete aggregate in a proportion of at least 90 mass %, that is to say for example also in a proportion of at least 95 mass %, 98 mass % or 99 mass %, in each case in relation to the total mass of the bulk material. In accordance with one embodiment, the bulk material comprises exclusively concrete aggregate, that is to say is formed exclusively from concrete aggregate.

In the context of the present invention, the term 'concrete aggregate' is understood to mean recycled, comminuted concrete, that is to say concrete that has been comminuted following primary use thereof, for example in building construction or civil engineering, in order to be fed to a further, secondary use. The concrete aggregate is formed from the typical components of a concrete, i.e., aggregate materials and hardened cement paste. Here, the hardened cement paste forms a matrix in which the aggregate materials are incorporated. The hardened cement paste is formed from the typical components of a hardened cement, namely, substantially from calcium silicate hydrate phases (CSH phases) in addition to further components, such as calcium hydroxide and ettringite in particular.

The bulk material, when input into the reaction chamber, is preferably present in a particle size in the range >0 to 32 mm. In accordance with the invention, it has been found that bulk material in an appropriate particle size range on the one hand is present in a sufficiently small particle size in order to create the largest possible surface area, such that the concrete aggregate of the bulk material can react well with the carbon dioxide of the gas comprising carbon dioxide and the cement of the concrete aggregate can be carbonated by the carbon dioxide. Furthermore, however, the bulk material with an appropriate particle size is large enough to be present in the reactor in the form of a loose bulk material, such that the reaction chamber is not frequently clogged by the bulk material or the bulk material does not clump together, in which case it therefore could only be comminuted with difficulty. The bulk material is preferably present in a particle size completely or largely in a particle size above 0.1 mm, 1 mm or above 2 mm, for example in a particle size $d_{90}$ greater than 0.1 mm, 1 mm or 2 mm. The advantage of a suitably coarse particle size distribution, completely or largely free of finely ground constituents, also lies in the fact that less energy is to be expended for comminution of the concrete. By way of example, the bulk material can be present in a particle size in the range from 2 to 22 mm, wherein the bulk material by way of example can be present in closely staggered particle groups, for example in particle groups from 2 to 8 mm, from 8 to 16 mm and/or from 16 to 22 mm.

A concrete aggregate having a specific void volume can be used. By way of example, the concrete aggregate may have a void volume in the range from 10 to 40 vol. %, that is to say for example also in the range from 15 to 32 vol. %. With a suitable void volume, concrete aggregate can be carbonated very advantageously.

It has been found in accordance with the invention that the hardened cement paste of the concrete aggregate of the bulk material is carbonated in an intensified manner during the period of time in which the concrete aggregate is left to react with the carbon dioxide if the concrete aggregate is wetted with water and in particular is largely or completely saturated with water during the period of time in which it is left to react with the carbon dioxide. By way of example, the bulk material can be saturated with water in particular during the comminution and/or the reaction period, in such a way that the concrete aggregate is saturated with water to an extent of at least 50%, that is to say for example also to an extent of at least 60%, 70%, 80% and particularly preferably at least 90%, 95% or 99%, and for example also practically 100%, in relation to the mass of water necessary for complete saturation of the concrete aggregate with water. In the case of a saturation of the aggregate to an extent of at least 99% or 100% with water, the concrete aggregate is saturated with water practically up to the saturation limit thereof.

In order to achieve such a high saturation of the concrete aggregate with water, bulk material in the reactor can be moved through a water bath, in particular during the comminution and/or reaction period in the reactor. By way of example, the bulk material in the reactor can be continuously moved into the water bath and out therefrom again, in particular also during the comminution and/or period of reaction with the carbon dioxide. It is thus ensured that the concrete aggregate, during the period of time in which it is left to react with the carbon dioxide, is continuously saturated with water to the desired extent.

The concrete aggregate can preferably be left to react in the reaction chamber with the carbon dioxide of the gas comprising carbon dioxide at increased temperature. By way of example, thermal energy can be fed to the reaction chamber during the period in which the concrete aggregate is left to react with the carbon dioxide. In accordance with a preferred embodiment, the concrete aggregate is left to react with the carbon dioxide at a temperature of at least 60° C. It has been found in accordance with the invention that the hardened cement paste of the concrete aggregate is carbonated in an intensified manner and also more quickly if the concrete aggregate is left to react with carbon dioxide at a suitably higher temperature. It has been found in accordance with the invention that the carbonation of the hardened cement paste of the concrete aggregate is decelerated if the temperatures during the reaction period are above 90° C. This may be because water components in the hardened cement paste of the concrete aggregate evaporate in an intensified manner at temperatures from 90° C., and the water components in the hardened cement paste advantageous for carbonation therefore are present to a smaller extent. The concrete aggregate is preferably left to react with the carbon dioxide at temperatures of at least 65° C. or preferably of at least 70° C. Furthermore, the concrete aggregate and the carbon dioxide can be left to react at temperatures of at most 90° C., preferably at most 85° C. and most preferably at most 80° C.

The potential feed of thermal energy into the reaction chamber in order to allow the concrete aggregate to react with the carbon dioxide at the previously mentioned temperatures can be implemented for example via heating means. However, in accordance with a particularly preferred embodiment, a combustion gas comprising carbon dioxide, in particular a hot combustion gas comprising carbon dioxide, is fed to the reaction chamber as gas comprising carbon dioxide. The use of such a combustion gas as gas comprising carbon dioxide has a number of significant advantages. On the one hand, the thermal energy of a hot combustion gas can be used in order to allow the hardened cement paste of the concrete aggregate to be carbonated in an accelerated manner, as described previously. For this reason, combustion gas in the reaction chamber can be fed in such a temperature range that the reaction between the concrete aggregate and the carbon dioxide of the combustion gas takes place in the range of the previously mentioned temperatures. The use of a hot combustion gas is extremely favourable in terms of energy, since additional energy costs for feeding thermal energy into the reaction chamber can be saved. Furthermore, the use of combustion gas as gas comprising carbon dioxide is also extremely advantageous from an environmental point of view, since the carbon dioxide of the combustion gas is at least partly bonded by the carbonation of the hardened cement paste and the environment is therefore left unharmed by this bonded proportion of carbon dioxide.

In accordance with one embodiment, the combustion gas in the reaction chamber can be fed directly from the combustion process or directly from the unit at which the combustion gas is produced. A closed system can thus be created, in which the carbon dioxide produced during the combustion process in the unit can be collected and bonded by carbonation by means of the method according to the invention.

By way of example, combustion or waste gases from a unit in the form of a cement rotary kiln, a calciner, a lime kiln or a fossil fuel power station, for example a gas-fired, oil-fired or coal-fired power station, can be combustion gases comprising carbon dioxide. In accordance with a preferred embodiment, the method according to the invention is carried out continuously. The bulk material therefore can be continuously input into the reaction chamber, gas comprising carbon dioxide can be continuously conducted into the reaction chamber, the bulk material can be continuously comminuted in the reaction chamber and left to react with the gas, and the reaction products can be continuously removed from the reaction chamber. Due to such a continuous method, reaction products can be produced from the bulk material in a very economical and uniform manner.

In accordance with a particularly preferred embodiment, the bulk material and the gas comprising carbon dioxide are conducted through the reaction chamber in opposite directions. The bulk material and the gas comprising carbon dioxide are therefore conducted through the reaction chamber in opposite flow directions. Such a method step has the advantage that the bulk material comes into contact uniformly and continuously with the carbon dioxide of the gas comprising carbon dioxide, such that the concrete aggregate can react uniformly and comprehensively with the carbon dioxide. By way of example, the bulk material on the one hand and the gas comprising carbon dioxide on the other hand can be fed to the reaction chamber or removed therefrom at opposite openings.

The bulk material is comminuted in the reaction chamber. In particular, the bulk material can be comminuted during the period of time in which the concrete aggregate is left to react with the carbon dioxide of the gas comprising carbon dioxide, and in particular is comminuted continuously during this reaction period. As mentioned above, this has the advantage in particular that new surfaces of the concrete aggregate are created by the continuous comminution, at which surfaces the hardened cement paste of the concrete aggregate can react with the carbon dioxide and in particular can carbonate. The comminution preferably can be performed abrasively, wherein the surface of the concrete aggregate is damaged or removed. For comminution of the bulk material or of the concrete aggregate of the bulk material, the bulk material can be comminuted in a rotating drum or a rotating tube, for example.

By way of example, the method according to the invention can be carried out in a rotary kiln. As is known, a rotary kiln is a tubular or drum-shaped kiln that is rotatable about the longitudinal axis thereof. In particular, the longitudinal axis can be inclined relative to the horizontal. During the treatment of the material to be treated in a rotary kiln, the rotary tube is rotated about the longitudinal axis thereof and the material to be treated is input at the higher end of the rotary tube into the interior of the rotary tube, i.e. the kiln chamber. Due to the rotary movement and the inclined position of the rotary tube, the material to be treated moves in the rotary kiln from the upper end of the rotary tube to the lower end of the rotary tube, at which it can be removed from the rotary kiln. At the same time, the material to be treated in the rotary kiln is comminuted by the rotary movement or the surface of said material is continuously damaged. In accordance with the invention, the reaction chamber may be the kiln chamber of a rotary kiln. Due to the rotation of the rotary kiln, the bulk material is thus comminuted continuously whilst it is guided through the kiln chamber of the rotary kiln. In order to intensify the comminution of the bulk material in the kiln chamber of the rotary kiln, the kiln chamber may have protrusions, for example in the form of fins, plates, bars or nubs. During the rotation of the rotary kiln, these protrusions contribute to an intensified comminution of the concrete aggregate.

One advantage in carrying out the method according to the invention in a rotary kiln lies in the fact that the method can be carried out continuously in a rotary kiln. A further advantage lies in the fact that, in a rotary kiln, the bulk material and the gas comprising carbon dioxide can be guided particularly easily in opposite flow directions through the reaction chamber or the kiln chamber. The bulk material thus can be introduced into the kiln chamber of the rotary kiln at the upper end and can be removed from the kiln chamber at the lower end, whereas the gas comprising carbon dioxide is introduced into the kiln chamber at the low end and is removed from the kiln chamber at the higher end.

A further key advantage of the use of a rotary kiln to carry out the method according to the invention lies in the fact that the bulk material in the kiln chamber of the rotary tube can be guided continuously through a water bath. By way of example, the kiln chamber of the rotary kiln can be filled partly with water, such that the bulk material is guided continuously into this water bath and out therefrom again as the rotary kiln rotates. Here, the rotary kiln is formed in such a way that water is prevented from running out at the lower end of the rotary tube. By way of example, the lower end of the rotary tube may have a diaphragm, that is to say a radially inwardly projecting wall, which is open centrally. This wall or diaphragm retains a water bath formed in the kiln interior and leaves open centrally an opening for the discharge of the reaction products from the kiln interior.

In accordance with an alternative embodiment, the method according to the invention can be carried out for example in a shaft kiln. Here, the bulk material comprising the concrete aggregate, corresponding to calcining limestone, can be input into the shaft kiln at the top and the reaction products can be removed from the shaft kiln at the bottom. Furthermore, gas comprising carbon dioxide can be conducted through the shaft kiln in the opposite direction, that is to say can be introduced into the shaft kiln at the bottom and removed therefrom at the top. In accordance with the invention, it has been found that the method according to the invention can be carried out particularly advantageously in a shaft kiln if this, for example, has a height:diameter ratio in the range from 2 to 3. Furthermore, the reaction chamber formed in the interior of the shaft kiln can be formed in a manner widening comically outwardly at the bottom. A clogging of the shaft kiln by the bulk material can be prevented as a result.

The invention also relates to a device for carrying out the method described herein, said device being in the form of a rotary kiln that is rotatable about the kiln axis thereof, this being arranged at an incline relative to the horizontal, that at its upper end has an inlet opening for inputting the bulk material into the kiln chamber formed as a reaction chamber, and that at its lower end has an outlet opening for removing the reaction products from the kiln chamber, wherein the kiln chamber is produced in such a way that a water bath can be formed therein, through which water bath the bulk material can be guided, in particular during the comminution of this bulk material and/or during the period of reaction between the concrete aggregate and the carbon dioxide of the gas comprising carbon dioxide.

In addition, the rotary kiln can be formed in such a way that the method according to the invention described herein can be carried out by this rotary kiln. Further features of the invention will emerge from the dependent claims, the accompanying FIGURE and also the associated description of the FIGURE.

All the features of the invention can be combined with one another arbitrarily, either individually or in combination.

An exemplary embodiment of a rotary kiln according to the invention by which the method according to the invention can be performed will be explained in greater detail with reference to the following description of the FIGURE.

BRIEF DESCRIPTION OF THE DRAWINGS

The exemplary embodiment shows, in a highly schematic manner

The FIGURE is a lateral sectional view through a rotary kiln according to the invention.

DETAILED DESCRIPTION OF THE PREFERRED EMBODIMENT

The rotary kiln denoted in its entirety by reference sign 1 comprises a rotatable rotary tube 3. The rotary tube 3 is constructed substantially as a rotary tube of a known cement rotary kiln and therefore on the whole has essentially the form of a cylindrical tube. The rotary tube 3 is rotatable about its kiln longitudinal axis 5, which is arranged at an incline to the horizontal.

The kiln chamber 7 of the rotary kiln 3 is formed as a reaction chamber for receiving bulk material 9 comprising concrete aggregate. At its upper entry-side end, the rotary tube 3 has an inlet opening 11, and at its opposite, lower end has an outlet opening 13. Bulk material 9 comprising concrete aggregate can be introduced into the kiln chamber 7 through the inlet opening 11. In the exemplary embodiment, the bulk material 9 is introduced into the inlet opening 11 by means of a belt conveyor 13. Reaction products 23 formed in the reaction chamber 7 can be removed from the kiln chamber 7 through the outlet opening 13.

In the exemplary embodiment, the bulk material 9 consists to an extent of practically 100 mass % of concrete aggregate in a particle size distribution from 2 to 22 mm.

The rotary tube 3 has, at the lower end thereof, a diaphragm 15, which extends annularly radially inwardly from the rotary tube 3, wherein the outlet opening 13 is open centrally. The rotary tube 3 is filled partly with water. The water is prevented from running out at the end of the rotary tube 3 by the diaphragm 15.

A grate 17 is arranged at an incline below the outlet opening 13. At the lower end of the grate 17, a belt conveyor 19 adjoins the grate 17. The grate 17 and belt conveyor 19 are formed in such a way that reaction products 23 removable or falling out from the outlet opening 13 slide via the grate 17 onto the belt conveyor 19 and can then be transported away by the belt conveyor 19.

A pipe 21, through which combustion gas comprising carbon dioxide can be conducted into the kiln chamber 7, leads into the outlet opening 13. The pipe 21 is directly connected fluidically to a combustion gas intake (not illustrated) for drawing combustion gases comprising carbon dioxide from a unit.

A method according to the invention can be carried out by the rotary kiln 1 according to the FIGURE as follows.

The bulk material 9 is first input via the belt conveyor 13 through the inlet opening 11 into the kiln chamber 7 of the rotary tube 3. Due to the inclination and rotation of the rotary tube 3 about the longitudinal axis 5 thereof, the bulk material 9 moves forwards from the region of the inlet opening 11 in the direction of the outlet opening 13. As the bulk material 9 passes through the kiln chamber 7 in this way, combustion gas comprising carbon dioxide is conducted continuously through the pipe 21 into the kiln chamber 7. The concrete aggregate of the bulk material 9 thus comes into contact with the carbon dioxide of the fed combustion gas. The combustion gases comprising carbon dioxide are fed to the kiln interior 7 at a temperature of approximately 75° C., such that the concrete aggregate of the bulk material 9 is reacted at this temperature in the kiln interior 7 with the carbon dioxide. The combustion gas comprising carbon dioxide, as mentioned previously, is introduced into the kiln chamber 7 in the region of the outlet opening 13, then is conducted through the kiln chamber 7 and lastly is removed again therefrom through the inlet opening 11. The removed gas can be collected and then further processed.

When the concrete aggregate 9 is left to react with the carbon dioxide of the combustion gases, carbon dioxide of the combustion gases reacts with the hardened cement paste of the concrete aggregate 9, wherein in particular calcium oxide of the CSH phases of the hardened cement paste is carbonated to form calcium carbonate. This reaction is promoted significantly in the exemplary embodiment by three factors: Firstly by the temperature of 75° C. at which the reaction takes place. Secondly by the rotation of the rotary tube 3, by means of which the concrete aggregate of the bulk material 9 is continuously comminuted and as a result continually forms new surfaces that can react with the carbon dioxide. Thirdly, the reaction is promoted in that the bulk material 9 is guided continuously through the water bath during the reaction period, such that the concrete aggregate is saturated with water to an extent of almost 100%.

Lastly, the concrete aggregate of the bulk material 9 reacts with the carbon dioxide of the combustion gases to form reaction products 23. These reaction products basically comprise calcium carbonate and loose aggregate materials.

Due to the continuous loading of the kiln interior 7 with further bulk material 9 and the rotation of the rotary tube 3, these reaction products 23 fall continuously through the outlet opening 13 onto the grate 17 arranged therebelow and slide onwards over this grate onto the belt conveyor 19, which transports them away, whereupon the reaction products 23 can be further processed.

The bulk material 9 on the one hand and the combustion gas comprising carbon dioxide on the other hand are conducted through the kiln chamber 7 in opposite directions, as is clear from the description of the FIGURE.

In order to examine the extent to which the movement of the bulk material 9 through a water bath during the comminution and reaction period affects the reaction of the concrete aggregate with carbon dioxide, tests were carried out of which the results are shown in Table 1. On the whole, the tests were carried out on the twelve samples specified in Table 1.

Specifically, concrete aggregate of different particle size distribution and with different cements was input during the tests into a reaction chamber in the form of a cement rotary kiln and was subjected to a counterflow of carbon dioxide. The concrete aggregate was comminuted by the rotation of the cement rotary kiln. At the same time, a water bath was formed in the cement rotary kiln in the case of samples 7-12, through which water bath the concrete aggregate was moved during the comminution and application of carbon dioxide. The reaction products were then removed from the cement rotary kiln. By contrast, in the case of samples 1 to 6, no water bath was formed in the rotary kiln during comminution or the reaction period.

The following information is provided in the columns of Table 1:

The column entitled "particle size distribution" specifies the particle size distribution in mm of the corresponding sample or concrete aggregate upon input into the cement rotary kiln.

The column entitled "cement" specifies the cement used to create the concrete from which the concrete aggregate is formed.

The column entitled "raw density of the sample" specifies the raw density of the respective sample in $kg/dm^3$.

The column entitled "water absorption of the sample" specifies the maximum possible water absorption of the respective sample (in mass % of water in relation to 100 mass % of the respective sample without absorbed water).

The column entitled "$CO_2$ absorption" specifies the mass of carbon dioxide absorbed by the respective sample during execution of the method (in mass % of carbon dioxide in relation to 100 mass % of the respective sample without absorbed carbon dioxide).

The column entitled "reacted CaO proportion" specifies the mass of CaO of the respected sample that has reacted with carbon dioxide during execution of the method (in mass % of CaO in relation to 100 mass % of the respective sample inclusive of the CaO component thereof).

The column entitled "CaO component" specifies the proportion of CaO that has reacted with the carbon dioxide during the method (in mass % of CaO in relation to the total mass of CaO of the respective sample).

The column entitled "raw density of the reaction product" specifies the raw density of each of the reaction products obtained following execution of the method (in $kg/dm^3$).

The column entitled "water absorption of the reaction product" specifies the density of the reaction products obtained from the respective samples following execution of the method (in mass % of water in relation to 100 mass % of the respective reaction products).

Table 1 clearly shows that the movement of the reaction product through a water bath during the comminution of the concrete aggregate and during the period of reaction thereof with carbon dioxide causes a much higher proportion of CaO of the concrete aggregate to react with carbon dioxide. By way of example, in the case of sample 10 up to 56.6% of the CaO component of the concrete aggregate reacted with carbon dioxide. By contrast, in the tests according to samples 1 to 6, a maximum of 39.1% of the CaO component of the concrete aggregate reacted with carbon dioxide.

On average, a proportion of 43.7% of the CaO of the samples reacted with carbon dioxide in the tests according to samples 7 to 12, whereas this was only approximately 21.9% in the tests with samples 1 to 6.

These tests show that the movement of the concrete aggregate through a water bath during the comminution and period of reaction of the concrete aggregate with the carbon dioxide causes a much higher proportion of CaO of the concrete aggregate to react with carbon dioxide compared to tests in which the samples were not moved through a water bath.

TABLE 1

| Sample number | Particle size distribution (mm) | Cement | Raw density of the sample ($kg/dm^3$) | Water absorption of the sample (%) | $CO_2$ absorption (%) | reacted CaO proportion of the sample (%) | CaO component | Raw density of the reaction product ($kg/dm^3$) | Water absorption of the reaction product (%) |
|---|---|---|---|---|---|---|---|---|---|
| 1 | >0-4 | CEM I 52.5 | 2.3 | n.d. | 4.0 | 5.1 | 39.1 | n.d. | n.d. |
| 2 | >4-8 | CEM I 52.5 | 2.3 | 8.9 | 1.8 | 2.2 | 17.2 | n.d. | n.d. |
| 3 | >8-16 | CEM I 52.5 | 2.3 | 8.1 | 1.5 | 1.9 | 14.6 | 2.4 | 2.5 |
| 4 | >0-4 | CEM III/A 52.5 | 2.4 | n.d. | 3.2 | 4.1 | 31.5 | n.d. | n.d. |
| 5 | >4-8 | CEM III/A 52.5 | 2.3 | 8.0 | 1.5 | 1.9 | 14.6 | n.d. | n.d. |
| 6 | >8-16 | CEM III/A 52.5 | 2.2 | 7.9 | 1.5 | 1.9 | 14.5 | 2.6 | 2.9 |
| 7 | >0-4 | CEM I 52.5 | 2.3 | n.d. | 5.5 | 7.0 | 53.9 | n.d. | n.d. |
| 8 | >4-8 | CEM I 52.5 | 2.3 | 8.9 | 3.1 | 3.9 | 30.2 | 2.5 | 3.2 |
| 9 | >8-16 | CEM III/A 52.5 | 2.3 | 8.1 | 3.8 | 4.9 | 37.5 | 2.5 | 3.2 |
| 10 | >0-4 | CEM III/A 52.5 | 2.4 | n.d. | 5.8 | 7.4 | 56.6 | n.d. | n.d. |

TABLE 1-continued

| Sample number | Particle size distribution (mm) | Cement | Raw density of the sample (kg/dm$^3$) | Water absorption of the sample (%) | $CO_2$ absorption (%) | reacted CaO proportion of the sample (%) | CaO component | Raw density of the reaction product (kg/dm$^3$) | Water absorption of the reaction product (%) |
|---|---|---|---|---|---|---|---|---|---|
| 11 | >4-8 | CEM III/A 52.5 | 2.3 | 8.0 | 3.1 | 3.9 | 30.3 | 2.4 | 2.9 |
| 12 | >8-16 | CEM IIIA 52.5 | 2.2 | 7.9 | 5.5 | 7.0 | 53.7 | 2.4 | 2.9 |

Having described the invention, the following is claimed:

1. A method for producing aggregate materials and calcium carbonate from concrete aggregate, said method comprising the following steps:
   providing a rotary kiln comprising a kiln chamber formed as a reaction chamber, the rotary kiln being arranged at an incline relative to the horizontal;
   at least partially filling said reaction chamber with water to provide a water bath;
   introducing bulk material comprising concrete aggregate into said reaction chamber;
   feeding a gas comprising carbon dioxide into the reaction chamber;
   comminuting the bulk material in the reaction chamber;
   allowing the concrete aggregate and the gas comprising carbon dioxide to react with one another to form reaction products in the reaction chamber;
   rotating said rotary kiln such that the bulk material is guided continuously into said water bath and out therefrom during the comminution and the reaction; and
   removing the reaction products from the reaction chamber.

2. The method according to claim 1, wherein the bulk material and the gas comprising carbon dioxide are conducted through the reaction chamber in opposite directions.

3. The method according to claim 1, wherein the concrete aggregate of the bulk material and the gas comprising carbon dioxide are left to react with one another so as to form reaction products at a temperature in a temperature range from 60 to less than 90° C.

4. The method according to claim 1, wherein a combustion gas comprising carbon dioxide is fed to the reaction chamber.

5. The method according to claim 1, wherein the bulk material is saturated with water during the comminution and the reaction period, such that the concrete aggregate is saturated with water to an extent of at least 90% in relation to the mass of water necessary for complete saturation of the concrete aggregate with water.

6. The method according to claim 1, wherein the bulk material comprises concrete aggregate to an extent of at least 90 mass % in relation to the mass of the bulk material.

7. The method according to claim 1, wherein the concrete aggregate is formed from hardened cement paste and aggregate.

8. The method according to claim 1, wherein the calcium carbonate removed from the reaction chamber is calcined to form calcium oxide.

9. The method according to claim 1, wherein said rotary kiln is rotatable about an axis of the rotary kiln,
   wherein an upper end of the rotary kiln has an inlet opening for inputting the bulk material into the reaction chamber, and
   wherein a lower end of the rotary kiln has an outlet opening for removing the reaction products from the reaction chamber.

10. The method according to claim 1, further comprising:
    saturating the concrete aggregate with water,
    wherein the saturating comprises said guiding of the bulk material through the water bath during the comminution and the reaction period.

11. The method according to claim 10, wherein the concrete aggregate is saturated to an extent of at least 50% in relation to the mass of the bulk material.

12. The method according to claim 10, wherein the concrete aggregate is saturated to an extent of at least 99% in relation to the mass of the bulk material.

* * * * *